(12) United States Patent
Giralte

(10) Patent No.: US 10,715,471 B2
(45) Date of Patent: Jul. 14, 2020

(54) SYSTEM AND METHOD FOR PROOF-OF-WORK BASED ON HASH MINING FOR REDUCING SPAM ATTACKS

(71) Applicant: Synchronoss Technologies, Inc., Bridgewater, NJ (US)

(72) Inventor: Luis Campo Giralte, Dublin (IE)

(73) Assignee: Synchronoss Technologies, Inc., Bridgewater, NJ (US)

(*) Notice: Subject to any disclaimer, the term of this patent is extended or adjusted under 35 U.S.C. 154(b) by 161 days.

(21) Appl. No.: 16/108,383

(22) Filed: Aug. 22, 2018

(65) Prior Publication Data

US 2020/0067862 A1    Feb. 27, 2020

(51) Int. Cl.
  *H04L 12/58*    (2006.01)
  *H04L 9/06*    (2006.01)

(52) U.S. Cl.
  CPC ............ *H04L 51/12* (2013.01); *H04L 9/0643* (2013.01); *H04L 2209/38* (2013.01); *H04L 2209/46* (2013.01)

(58) Field of Classification Search
  CPC ...... G06F 21/552; G06F 21/31; G06F 21/602; G06F 21/57; G06F 2221/2103; G06F 21/335; G06F 21/41; G06F 21/43; G06F 21/445; G06F 21/53; G06F 21/54; G06F 2221/2137; G06F 3/0617; G06F 3/0632; G06F 3/0673; G06F 8/61; G06Q 10/107; G06Q 30/0255; G06Q 20/322; G06Q 20/3226; G06Q 20/3227; G06Q 20/327; G06Q 20/382; G06Q 20/3821; G06Q 20/38215; G06Q 20/3825; G06Q 20/3827; G06Q 20/3829; H04L 63/0853; H04L 63/107; H04L 63/108; H04L 63/126; H04L 9/3271; H04L 9/3273; H04L 63/1441; H04L 63/145; H04L 63/1458; H04L 63/1466; H04L 63/1475; H04L 63/1483; H04L 63/1491; H04L 9/3236; H04L 9/3239; H04L 9/3242; H04L 9/3247; H04L 63/0823; H04L 63/08; H04L 63/083; H04L 9/3268; H04L 2209/24; H04L 2209/38; H04L 2209/46; H04L 2209/466; H04L 2209/72; H04L 2209/80; H04L 2463/102; H04L 54/12; H04L 51/14; H04L 51/18; H04L 51/20; H04L 51/32; H04L 51/38;
  (Continued)

(56) References Cited

U.S. PATENT DOCUMENTS 6,546,416 B1 *  4/2003  Kirsch .................. G06Q 10/107
                                                      709/206
7,606,915 B1 * 10/2009  Calinov .................. G06F 21/36
                                                      709/229
  (Continued)

*Primary Examiner* — Greg C Bengzon
(74) *Attorney, Agent, or Firm* — SynchronossTechologies, Inc.; Frederick W. Dour

(57) ABSTRACT

A method for providing a proof-of-work challenge based on hash mining for reducing spam attacks comprising: receiving an email message from a client device; determining a level of trustworthiness of the client device; generating a challenge message based on the determined trustworthiness of the client device; transmitting the challenge message to the client device; receiving a response to the challenge message from the client device; and forwarding the email to one or more recipients when the response to the challenge message is correct.

14 Claims, 4 Drawing Sheets

US 10,715,471 B2

Page 2

(58) Field of Classification Search
CPC ............ H04L 63/0492; H04L 63/0807; H04L 63/0815; H04L 63/10; H04L 63/12; H04L 9/0643; H04L 9/14; H04L 9/3013; H04L 9/3093; H04L 9/3218; H04L 9/3221; H04L 9/3234; H04L 9/3255; H04L 9/3263; H04L 9/3297; H04L 51/12; H04W 12/06; H04W 12/02; H04W 12/0609; H04W 12/10; H04W 12/1006; H04W 12/12; H04W 4/60

See application file for complete search history.

(56) References Cited

U.S. PATENT DOCUMENTS

| Patent/Pub No. | Kind | Date | Inventor | Class |
|---|---|---|---|---|
| 7,693,945 | B1* | 4/2010 | Dulitz | H04L 51/12 709/206 |
| 7,694,335 | B1* | 4/2010 | Turner | H04L 63/1441 708/250 |
| 7,873,996 | B1* | 1/2011 | Emigh | H04L 51/12 726/22 |
| 7,908,330 | B2* | 3/2011 | Oliver | H04L 51/12 709/204 |
| 8,046,832 | B2* | 10/2011 | Goodman | H04L 51/12 709/206 |
| 8,843,997 | B1* | 9/2014 | Hare | H04L 63/0281 709/200 |
| 9,331,995 | B2* | 5/2016 | Schneider | G06F 21/57 |
| 9,398,143 | B1* | 7/2016 | Fullmer | H04W 12/06 |
| 9,767,449 | B2* | 9/2017 | Brody | G06Q 20/12 |
| 9,992,018 | B1* | 6/2018 | Tjew | H04L 9/0861 |
| 10,148,606 | B2* | 12/2018 | Jeyaraman | H04L 51/12 |
| 10,541,996 | B1* | 1/2020 | Choi | H04L 63/0823 |
| 2001/0024501 | A1* | 9/2001 | Furukawa | H04L 9/3271 380/28 |
| 2003/0065956 | A1* | 4/2003 | Belapurkar | G06F 21/41 726/14 |
| 2003/0163686 | A1* | 8/2003 | Ward | G06F 21/33 713/156 |
| 2003/0220978 | A1* | 11/2003 | Rhodes | H04L 51/12 709/206 |
| 2004/0093371 | A1* | 5/2004 | Burrows | H04L 51/12 709/201 |
| 2004/0093372 | A1* | 5/2004 | Chen | H04L 63/0823 709/203 |
| 2004/0098585 | A1* | 5/2004 | Grove | G06F 21/31 713/168 |
| 2005/0021649 | A1* | 1/2005 | Goodman | G06F 21/316 709/207 |
| 2005/0055410 | A1* | 3/2005 | Landsman | H04L 51/12 709/206 |
| 2005/0120201 | A1* | 6/2005 | Benaloh | G06F 21/31 713/155 |
| 2005/0132060 | A1* | 6/2005 | Mo | H04L 51/12 709/227 |
| 2006/0168006 | A1* | 7/2006 | Shannon | G06Q 10/107 709/206 |
| 2006/0248573 | A1* | 11/2006 | Pannu | G06F 21/62 726/1 |
| 2007/0011453 | A1* | 1/2007 | Tarkkala | H04L 9/3013 713/168 |
| 2007/0157300 | A1* | 7/2007 | Sivaradjane | H04L 63/1458 726/9 |
| 2007/0185814 | A1* | 8/2007 | Boccon-Gibod | G06F 21/10 705/51 |
| 2008/0244009 | A1* | 10/2008 | Rand | G06Q 10/107 709/206 |
| 2009/0047928 | A1* | 2/2009 | Utsch | G06F 21/40 455/410 |
| 2009/0106557 | A1* | 4/2009 | Leonard | H04L 51/12 713/179 |
| 2009/0287926 | A1* | 11/2009 | Furukawa | H04L 9/3221 713/168 |
| 2010/0144314 | A1* | 6/2010 | Sherkin | G06F 21/33 455/411 |
| 2010/0150353 | A1* | 6/2010 | Bauchot | G06F 21/32 380/282 |
| 2010/0180333 | A1* | 7/2010 | Bono | H04L 51/12 726/13 |
| 2011/0072274 | A1* | 3/2011 | Leoutsarakos | H04L 9/3268 713/182 |
| 2011/0103586 | A1* | 5/2011 | Nobre | H04L 9/3263 380/270 |
| 2011/0231913 | A1* | 9/2011 | Feng | G06F 21/46 726/7 |
| 2012/0102319 | A1* | 4/2012 | Falk | G06F 21/305 713/156 |
| 2012/0124664 | A1* | 5/2012 | Stein | G06F 15/16 726/22 |
| 2012/0144457 | A1* | 6/2012 | Counterman | H04L 9/3247 726/5 |
| 2012/0242459 | A1* | 9/2012 | Lambert | H04W 12/0605 340/10.3 |
| 2012/0254333 | A1* | 10/2012 | Chandramouli | G06F 40/40 709/206 |
| 2012/0272060 | A1* | 10/2012 | Lin | H04L 9/0869 713/165 |
| 2013/0024577 | A1* | 1/2013 | Krishnaswamy | G06Q 10/107 709/227 |
| 2013/0111211 | A1* | 5/2013 | Winslow | H04L 9/3234 713/171 |
| 2013/0219473 | A1* | 8/2013 | Schaefer | G06F 21/335 726/4 |
| 2014/0068735 | A1* | 3/2014 | Marinov | G06F 21/31 726/7 |
| 2014/0282974 | A1* | 9/2014 | Maher | H04L 63/08 726/7 |
| 2014/0289833 | A1* | 9/2014 | Briceno | H04L 63/08 726/7 |
| 2015/0007273 | A1* | 1/2015 | Lin | H04L 63/08 726/4 |
| 2015/0052616 | A1* | 2/2015 | Hutchison | G06F 21/53 726/27 |
| 2015/0058950 | A1* | 2/2015 | Miu | H04L 63/105 726/7 |
| 2015/0059003 | A1* | 2/2015 | Bouse | G06F 16/2228 726/28 |
| 2015/0128236 | A1* | 5/2015 | Moscicki | H04L 63/0876 726/7 |
| 2015/0310444 | A1* | 10/2015 | Chen | G06Q 20/4016 705/44 |
| 2016/0048662 | A1* | 2/2016 | Arnoud | G06F 21/31 726/5 |
| 2016/0066189 | A1* | 3/2016 | Mahaffey | G06F 21/316 455/405 |
| 2016/0182221 | A1* | 6/2016 | Cucinotta | H04L 63/0428 713/153 |
| 2016/0286391 | A1* | 9/2016 | Khan | H04W 12/12 |
| 2016/0366126 | A1* | 12/2016 | Sharifi | H04L 63/083 |
| 2017/0019396 | A1* | 1/2017 | Bettenburg | G06F 21/57 |
| 2017/0070533 | A1* | 3/2017 | Bailey | H04L 63/1466 |
| 2017/0221055 | A1* | 8/2017 | Carlsson | G06Q 20/3821 |
| 2017/0237766 | A1* | 8/2017 | Mattson | H04L 63/1441 726/23 |
| 2017/0295180 | A1* | 10/2017 | Day | G07C 9/00309 |
| 2017/0353480 | A1* | 12/2017 | Gao | G06F 21/577 |
| 2017/0366547 | A1* | 12/2017 | Goldfarb | H04L 63/08 |
| 2018/0007087 | A1* | 1/2018 | Grady | H04L 63/0428 |
| 2018/0012134 | A1* | 1/2018 | Shetye | G06N 7/005 |
| 2018/0012272 | A1* | 1/2018 | Menard | H04W 12/00 |
| 2018/0063142 | A1* | 3/2018 | Ashiya | H04L 63/12 |
| 2018/0091453 | A1* | 3/2018 | Jakobsson | H04L 51/12 |
| 2018/0343250 | A1* | 11/2018 | Tang, Jr. | H04L 9/3271 |
| 2019/0116051 | A1* | 4/2019 | Rome | G06Q 20/223 |
| 2019/0278890 | A1* | 9/2019 | Koval | H04L 67/06 |
| 2019/0334718 | A1* | 10/2019 | Li | H04W 12/04071 |
| 2019/0373012 | A1* | 12/2019 | Mattson | G06F 21/60 |
| 2020/0067862 | A1* | 2/2020 | Giralte | H04L 9/0643 |

\* cited by examiner

SYSTEM AND METHOD FOR PROOF-OF-WORK BASED ON HASH MINING FOR REDUCING SPAM ATTACKS

BACKGROUND OF THE INVENTION

Field of the Invention

Embodiments of the present invention generally relate to application servers and, more particularly, to reducing SPAM attaches using proof-of-work based on hash mining.

Description of the Related Art

Unsolicited email messages (i.e., spam) are often sent in large quantities, causing the receiving email servers to consume significant amounts of system resources dealing with this unwanted traffic. As a result, service providers need to spend large amounts of money to make their systems capable of handling these large amounts of emails. Such costs are inevitably passed on to the service providers' customers.

In recent years it was calculated that about 90% of all emails sent are spam email. On one point, the number of spam messages sent per day was estimated to be approximately 200 billion. Since the expense of the spam is borne mostly by the recipient, it is estimated that due to spam, lost productivity costs Internet users billions of dollars.

Popular techniques for filtering and refusing spam include email filtering based on the content of the email, DNS-based black hole lists, which identify locations on the Internet reputed to send email spam, check-summing systems to detect bulk email, and proof-of-work systems that put some sort of moderately difficult cost on the sender, but are easy to check for the service provider. However, in proof-of-work systems, known safe senders are subjected to the same difficulty of work as potentially malicious senders.

Therefore, there is a need for a system and method for a proof-of-work based on hash mining for reducing spam attacks.

SUMMARY OF THE INVENTION

A method and system for a proof-of-work based on hash mining for reducing spam attacks is provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other and further embodiments of the present invention are described below.

BRIEF DESCRIPTION OF THE DRAWINGS

So that the manner in which the above recited features of embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
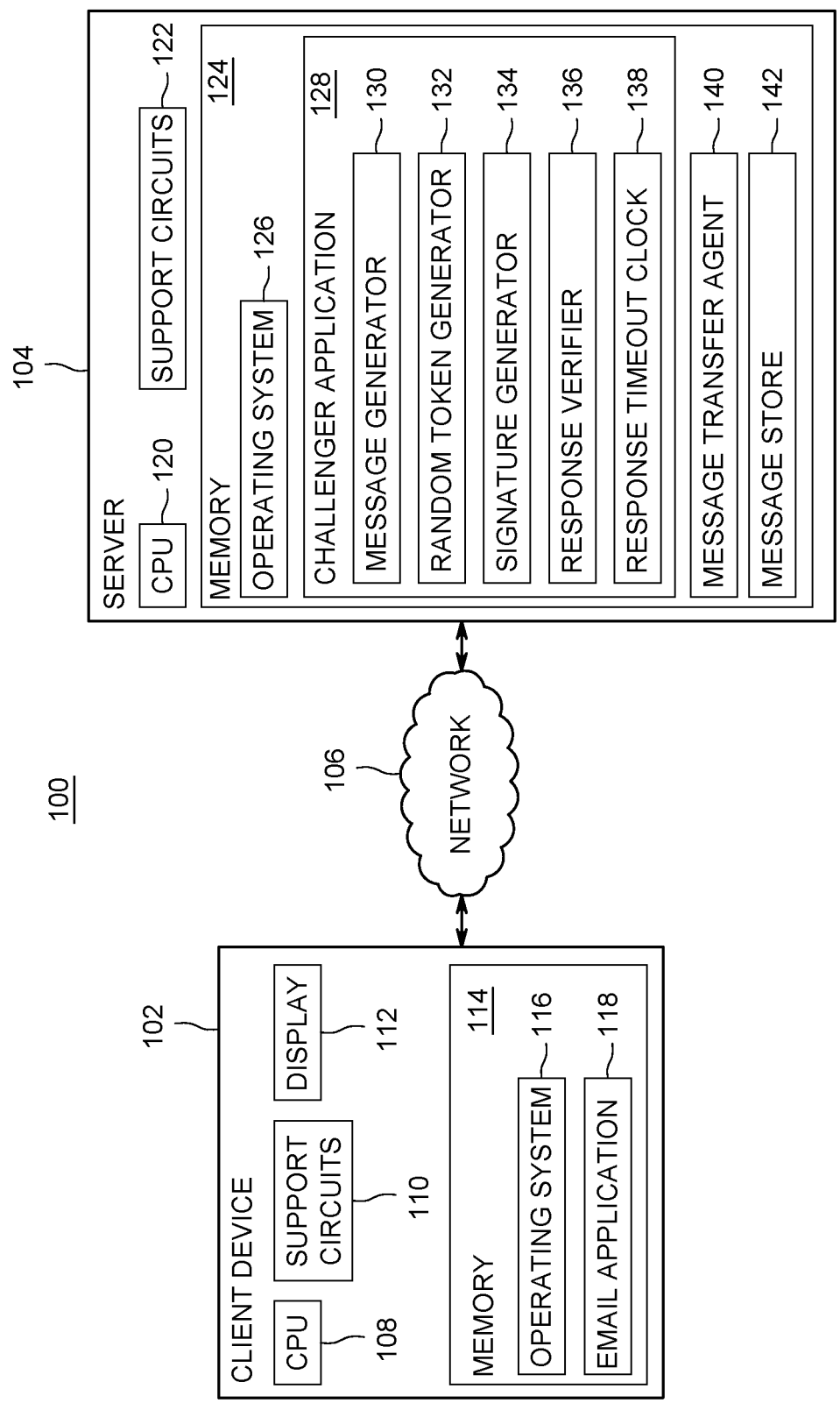
FIG. 1 is a block diagram of a system for a proof-of-work based on hash mining for reducing spam attacks, according to one or more embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION OF EMBODIMENTS

Embodiments of the present invention include a system and method for a proof-of-work based on hash mining for reducing spam attacks. When an email message is received from a client device, a challenge message is generated based on how trusted the client is. The challenge message requires the client to perform cryptographic operations in order to respond to the challenge message. A trusted client may be required to perform a minimal number of operations, for example, between one and ten operations in order to respond to the challenge message, while an unknown client may be required to perform a significantly large number of operations, for example millions in order to respond to the challenge message. In addition, a timeout feature limits the amount of time a client has to respond to the challenge message. If the client returns a correct response to the challenge message, in the allowed timeframe, a message is sent to the client and the email message received from the client device is processed.

The same challenge message may be used when a client device sends a request to retrieve emails from the server. The client device must correctly respond to the challenge message in order to receive the request emails.

Various embodiments of systems and methods for a proof-of-work based on hash mining for reducing spam attacks are provided below. In the following detailed description, numerous specific details are set forth to provide a thorough understanding of the claimed subject matter. However, it will be understood by those skilled in the art that claimed subject matter may be practiced without these specific details.

Figure 4:
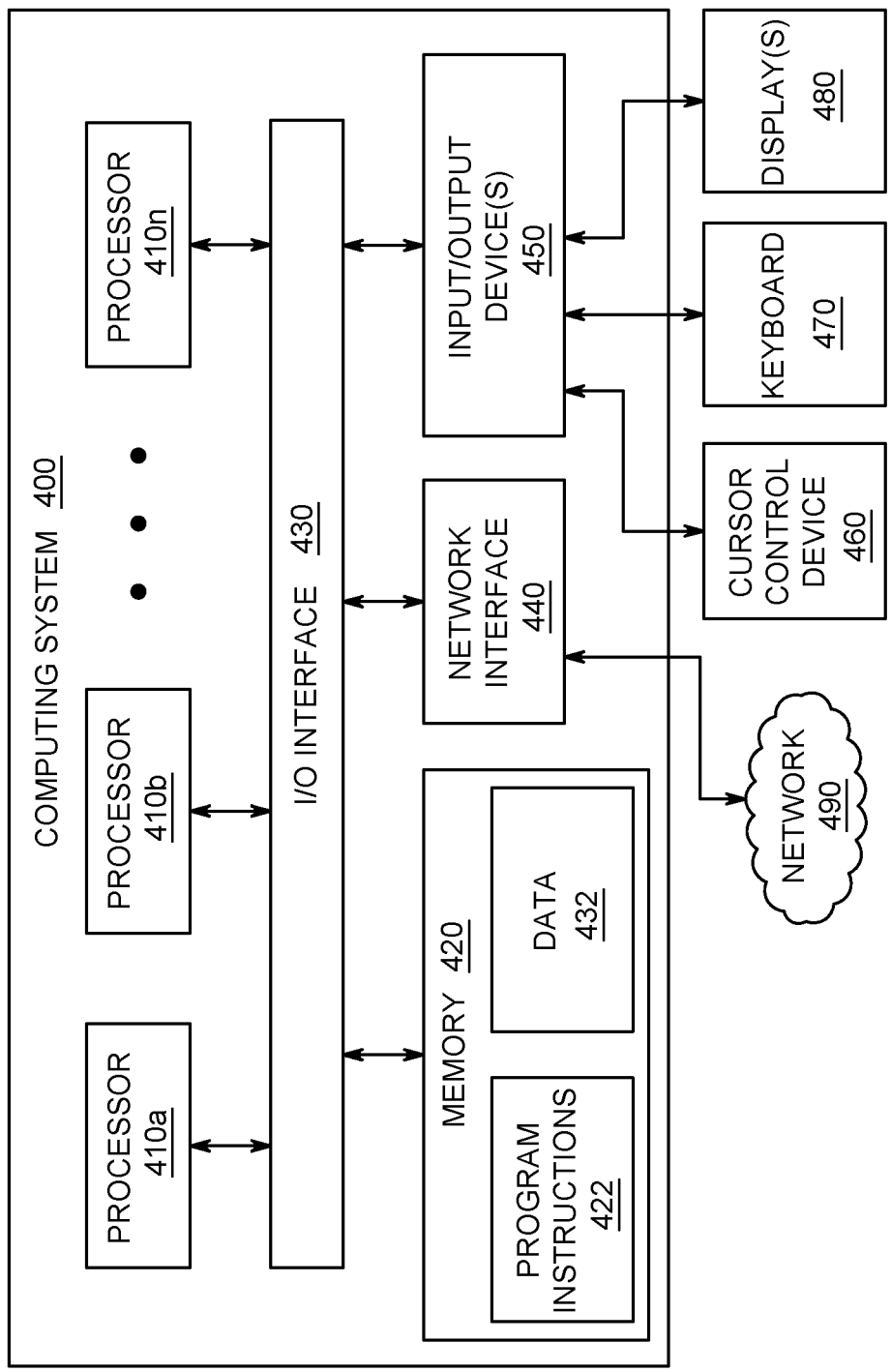
FIG. 4 is a detailed block diagram of a computer system, according to one or more embodiments.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. One example of a suitable computer is shown in FIG. 4, which will be described in detail below.

FIG. 1 is a block diagram of a system 100 for proof-of-work based on hash mining for reducing spam attacks, according to one or more embodiments. The system 100 includes a client device 102 and a server 104, communicatively coupled via network 106. The client device 102 includes a Central Processing Unit (CPU) 108, support circuits 110, a display 112, and a memory 114. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 114 includes at least one of Read Only Memory (ROM), Random Access Memory (RAM), disk drive storage, optical storage, removable storage and/or the like. The memory 114 includes an operating system 116, and at least an email application 118.

The server 104 is a computing device, for example, a desktop computer, laptop, tablet computer, and the like, or it may be a cloud based server (e.g., a blade server, virtual machine, and the like). One example of a suitable computer is shown in FIG. 4, which will be described in detail below. The server 104 includes a Central Processing Unit (CPU) 120, support circuits 122, and a memory 124. The memory includes an operating system 126, a challenger application 128, a mail transfer agent (MTA) 140, and a message store 142. The challenger application 128 includes a message generator 130, a random token generator 132, a signature generator 134, a response verifier 136, and a response timeout clock 138. The MTA 140 receives, routes, transports, and delivers mail messages using the Simple Mail Transport Protocol (SMTP) protocol. The MTA 140 delivers messages to the message store 142, which consists of a set of components that store, retrieve, and manipulate messages for mail clients. Email can be retrieved by POP, IMAP, or HTTP clients. The message store may use a directory server (not shown) to verify user login name and passwords for mail clients accessing their email in order to determine the trustworthiness of a client device The CPU 120 may include one or more commercially available microprocessors or microcontrollers that facilitate data processing and storage. The various support circuits 122 facilitate the operation of the CPU 120 and include one or more clock circuits, power supplies, cache, input/output circuits, and the like. The memory 124 includes at least one of Read Only Memory (ROM), Random Access Memory (RAM), disk drive storage, optical storage, removable storage and/or the like.

The server 104 may be connected to external systems via a network 106, such as a Wide Area Network (WAN) or Metropolitan Area Network (MAN), which includes a communication system that connects computers (or devices) by wire, cable, fiber optic and/or wireless link facilitated by various types of well-known network elements, such as hubs, switches, routers, and the like. The network interconnecting some components may also be part of a Local Area Network (LAN) using various communications infrastructure, such as Ethernet, Wi-Fi, a personal area network (PAN), a wireless PAN, Bluetooth, Near field communication, and the like.

When an email is received by the MTA 140, the challenger application 128 generates a challenge message to send to the client device 102 from where the email was received. The challenge message decreases the amount of spam emails that get forwarded to users from the server 104. The challenger application 128 may use a configurable plain text message to create the challenge message. When an email is received from a client device 102, the message generator 130 assembles a challenge message by first requesting a token from the random token generator 132. The random token generator 132 produces a unique random number. In some embodiments, the unique random number is generated for the current challenge session. In some embodiments, the unique random number is generated for the source IP address from where the email message was received. The random token generator 132 generates a number that signifies a number of hash functions the client device is required to perform on the challenge message in order to provide a correct response to the server 104. In some embodiments, the random token generator 132 generates a relatively low random number, for example between 1 and 10 for trusted clients and generates a relatively high random number, for example a number between 500,000 and 100,000,000 for unknown clients. When the random number is generated a estimated timeout may be calculated. Any method of determining an amount of time in which to expect a result from the client device may be used. For example, on a CPU INTEL® CORE™i7-6820HQ CPU @ 2.70 GHz, a random number of 1,000,000 (i.e., the number of hashes required to correctly respond to the challenge message), the CPU takes 1.135 seconds to perform 1,000,000 hashes. As such, the time allowed for responding before timeout may be 1.5 second. Alternatively, for an unknown user with a random number value of 100,000,000, it is calculated that the CPU may take 1 minute 52.620 seconds to perform 100,000,000 hashes, making the time allowed for responding to the challenge statement before a timeout, approximately 2 minutes.

The signature generator 134 performs a cryptographic hash function on the combination of the plain text message and the random token. The result is a signature, which the challenger application 128 assembles into the challenge message and transmits to the client device 102.

By way of example, the plain text message may be "Can you find this % d in here?" The random token is equal to the number of times the hash function must be performed on the challenge message. For example, the random token may be 236348734. The signature generator 134 then performs a hash, using for example an sha256 hash algorithm 235348734 times on the combination of the plain text and the random token (i.e. signature=sha256 (plain_text+random_token). In the present example, the resultant signature is equal to "b3f79dcd40279483800bf845734a339b33b87bb00b0a6a9 60940311026c3c3c0".

The challenger application 128 generates a HASHME message by compiling the generated information. In the present example, the resultant challenge message is:

HASHME "Can you find this % d in here?" "b3f79dcd40279483800bf845734a339b33b87bb00b0 a6a960940311026c3c3c0" sha256.

The challenge application 128 transmits the HASHME message back to the client device 102. At the same time, the response timeout clock 138 is set to an amount of time the client device 102 has to respond to the HASHME message, where the time is based on the random token.

The client device 102 receives the HASHME message. The email application 118 on the client device 102 must determine what integer belongs to the received signature. As such, the email application 118 performs the specified algorithm, in the present example, sha256 repeatedly until the result matches the signature, keeping track of a number of times the email application 118 performed the algorithm. When a match to the signature is found, the email application 118 returns a message to the server 104 specifying the number of times the algorithm was performed. The return message may be in the form GUESS <value>, where the <value> should match the random token generated at the server 104. In the present example, the return message is GUESS 235348734.

If, while waiting for the response, the time on the response timeout clock has lapsed, then the client device 102 is deem to be untrustworthy and the received email is discarded.

When received on the server 104, if the response timeout clock has not lapsed, the response verifier 136 checks the GUESS message value against the random token. If they match, the challenge application 128 returns an OK message. In some embodiments, the OK message is sent with a value that indicates a maximum number of messages the client device 102 may send through the server 104. In some embodiments, the OK message is sent denoting that the number of messages the client device 102 may send through the server 104 is unlimited. In some embodiments, if the GUESS message value and the random token do not match, the client device 102 is deemed untrustworthy. In some embodiments, if the GUESS message value and the random token do not match, a new HASHME message is sent to the client device 102 in order to give the client device 102 a second attempt to prove its trustworthiness.

Figure 2:
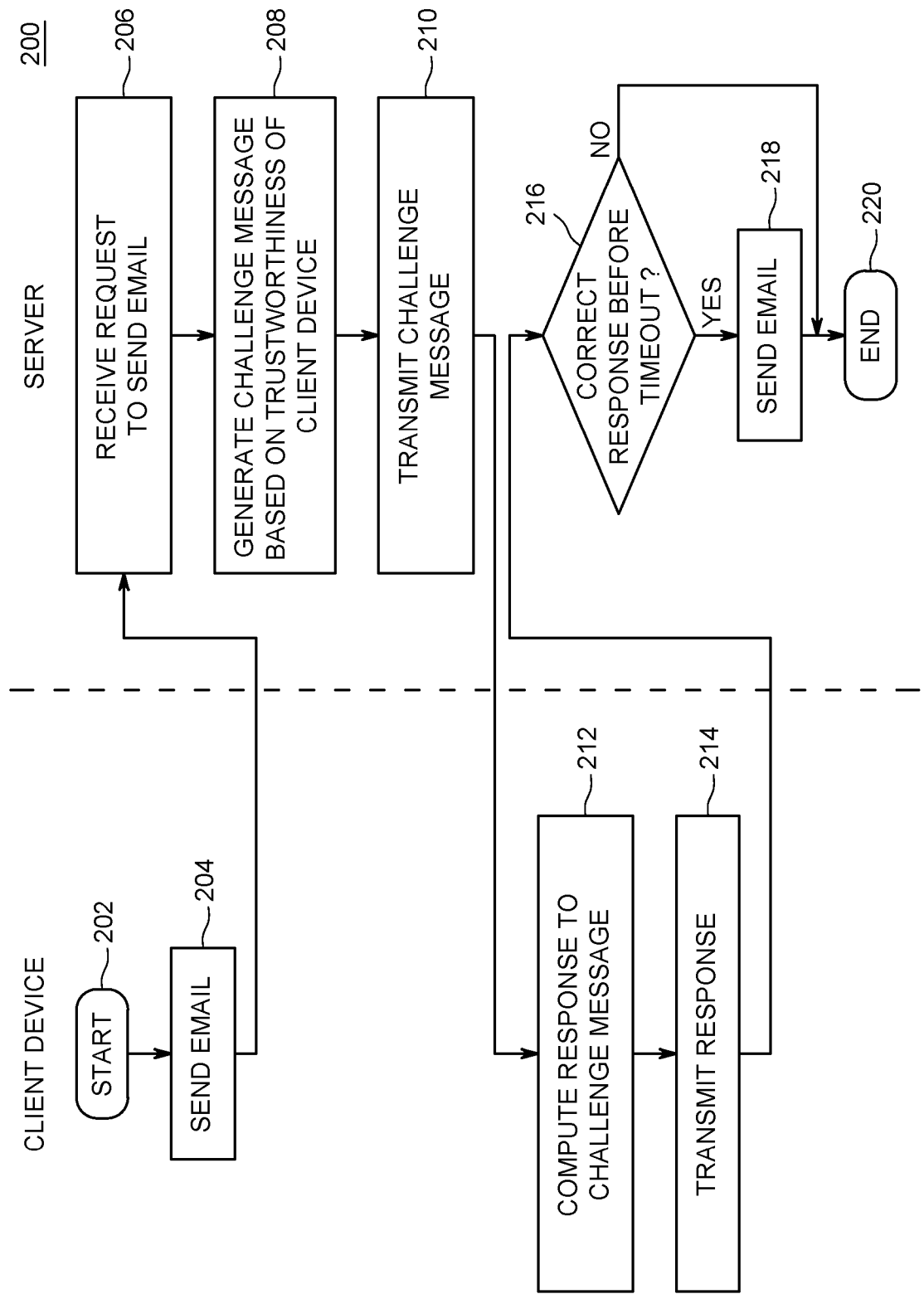
FIG. 2 depicts a flow diagram of a method for a proof-of-work based on hash mining for reducing spam attacks, according to one or more embodiments of the invention.

FIG. 2 depicts a flow diagram of a method 200 for a proof-of-work based on hash mining for reducing spam attacks, according to one or more embodiments of the invention. The method 200 begins at step 202 and proceeds to step 204.

At step 204, a client device sends an email message to the server.

At step 206, the server receives the email message. The email message may be received from a known and trusted client device or from an unknown client device. Trustworthiness may be based on whether a login to the server is required, or whether other policies are in place that indicate the trustworthiness of the client device.

At step 208, a challenge message is generated based on the trustworthiness of the client device. The details of how the challenge message is generated are described in more detail with respect to FIG. 3, below.

At step 210, the challenge message is transmitted to the client device.

At step 212, the client device must perform some amount of computational work in order to respond to the challenge message. The challenge message is in the form of a HASHME statement. The client device must respond to the HASHME statement in a predefined period of time in order for the server to forward the email message to one or more users. The client device performs the work and produces a response in the form of, for example a GUESS statement. The response includes a number value that represents a number of iterations of an algorithm, for example, a hash algorithm that were required to correctly respond to the challenge message.

At step 214, the response message, for example the GUESS message is transmitted back to the server.

At step 216, the challenge application on the server determines whether the value provided in the response message is correct, and whether the response was received in the allotted period of time (i.e., before the timeout clock runs out). If the response is correct and was received within the allowed timeframe, then at step 218, the email message is passed onto the one or more clients. A message, such as an OK message is transmitted to the client device to indicate the response was correct. The OK message may include a value that indicates a number of emails the client device may send. The number of emails may be a specific value, or the number of emails may be unlimited. The number of emails may be configurable based on a customer security policy. A customer may have this value restricted to, for example 200, while another customer may have this value restricted to, for example, 10,000. The method 200 proceeds to step 220 and ends.

However, if at step 216, the value provided in the response is incorrect or the response was received after the timeout clock ran out, then in some embodiments the email may be discarded and the method 200 proceeds to step 220 and ends. In some embodiments, if the response is incorrect or the response is not received before the timeout clock runs out, the method may proceed to step 208 where a new challenge message is generated and sent to the client device, and the method 200 iterates one more time, thereby providing a second chance to the client device.

Figure 3:
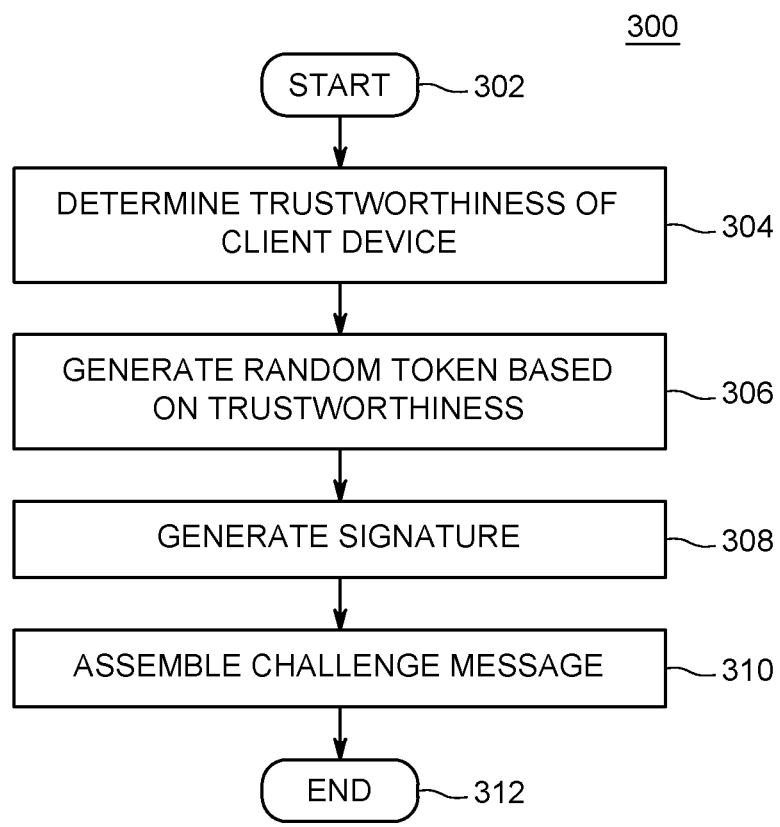
FIG. 3 depicts a block diagram of a method for generating a challenge message, according to one or more embodiments of the invention.

FIG. 3 depicts a flow diagram of a method 300 for generating a challenge message, according to one or more embodiments of the invention. The method 300 starts at step 302 and proceeds to step 304.

At step 304, the trustworthiness of the client device is determined. The trustworthiness of the client device may be based on a login protocol, a history of non-malicious behavior, or any method of verifying a client device. For example, when a client device logs into the system for the first time, no information exists regarding the behavior of a user of the client device. However, if emails are regularly sent from the client device with no associated malicious activity, then a lower random token may be used. Those skilled in the art will appreciate that any metrics available may be used to identify the device and/or associated user, for example an IP address, domain, user login, and the like.

At step 306, a random token is generated based on the determined trustworthiness of the client device. The random token defines how much work the client device must do to respond correctly to the challenge question. Work may be defined a number of CPU cycles that need to performed to prove to the server that the client device can be trusted, and therefore the email sent by the client device is not spam. If the client device is determined to be trustworthy, the generated random token may be a relatively low number, for example between 1 and 10. However, if the client device is unknown, the generated random token may be a significantly high number, for example over 500,000. If the email is from a known user, based for example on login credentials, but the client device is unknown or is in an atypical location, for example if the user is traveling and the client logged into an unknown device, the generated random token may be significantly high.

At step 308, a signature is generated. A plain text string that is predefined and configurable is combined with the random token and an algorithm is performed, for example a hash algorithm. In some embodiments, a sha256 hash may be performed on the text string/random token combination. The algorithm is performed a number of times equal to the value of the random token.

At step 310, the challenge message is assembled. The challenge message may include the word HASHME, followed by the plain text string, the signature, and the algorithm the client device must use to generate the correct response.

The method 300 ends at step 312.

FIG. 4 depicts a computer system 400 that can be utilized in various embodiments of the present invention to implement the computer and/or the display, according to one or more embodiments.

Various embodiments of method and apparatus for a proof-of-work based on hash mining for reducing spam attacks, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the methods 200 and 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the operations described with respect to FIG. 2 and FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined.

The invention claimed is:

1. A server providing a proof-of-work challenge based on hash mining for reducing spam attacks comprising:
   a) at least one processor;
   b) at least one input device; and
   c) at least one storage device storing processor-executable instructions which, when executed by the at least one processor, perform a method comprising:
      receiving an email message from a client device, the email message directed to an email recipient;
      determining a level of trustworthiness of the client device;
      generating a proof of work challenge message based on the determined trustworthiness of the client device, wherein generating the challenge message comprises:
         generating a random token based on the determined trustworthiness of the client device;
         generating a signature by performing a hash algorithm on a combination of the random token and a plain text string; and
         assembling the challenge message to include an instruction to perform a hash algorithm, the plain text string, the signature, and the hash algorithm to be used to perform the hash;
      transmitting the challenge message to the client device;
      receiving a response to the challenge message from the client device, the response from the client device comprising a value, and wherein in a correct response, the value is equal to the value of the random token; and
      forwarding the email to one or more recipients when the response to the challenge message is correct.

2. The server of claim 1, wherein the executed instructions further:
   discard the received email message when the response to the challenge message from the client device is incorrect.

3. The server of claim 1, wherein the executed instructions further:
   transmit to the client device an indication of a number of emails they may send through the server when the response to the challenge message is correct.

4. The server of claim 1, wherein the hash algorithm is a sha256 hash.

5. The server of claim 1, wherein the response from the client device that is received after a timeout period has expired is considered an incorrect response.

6. A computer-implemented method for providing a proof-of-work challenge based on hash mining for reducing spam attacks comprising:
  receiving an email message from a client device, the email message directed to an email recipient;
  determining a level of trustworthiness of the client device;
  generating a proof of work challenge message based on the determined trustworthiness of the client device, wherein generating the challenge message comprises:
    generating a random token based on the determined trustworthiness of the client device;
    generating a signature by performing a hash algorithm on a combination of the random token and a plain text string; and
    assembling the challenge message to include an instruction to perform a hash algorithm, the plain text string, the signature, and the hash algorithm to be used to perform the hash;
  transmitting the challenge message to the client device;
  receiving a response to the challenge message from the client device, the response from the client device comprising a value, and wherein in a correct response, the value is equal to the value of the random token; and
  forwarding the email to one or more recipients when the response to the challenge message is correct.

7. The method of claim 6, further comprising:
  discarding the received email message when the response to the challenge message from the client device is incorrect.

8. The method of claim 6, further comprising:
  transmitting to the client device an indication of a number of emails they may send when the response to the challenge message is correct.

9. The method of claim 6, wherein the hash algorithm is a sha256 hash.

10. The method of claim 6, wherein the response from the client device that is received after a timeout period has expired is considered an incorrect response.

11. A non-transitory computer readable medium for storing computer instructions that, when executed by at least one processor causes the at least one processor to perform a method for providing a proof-of-work challenge based on hash mining for reducing spam attacks comprising:
  receiving an email message from a client device, the email message directed to an email recipient;
  determining a level of trustworthiness of the client device;
  generating a proof of work challenge message based on the determined trustworthiness of the client device, wherein generating the challenge message comprises:
    generating a random token based on the determined trustworthiness of the client device;
    generating a signature by performing a hash algorithm on a combination of the random token and a plain text string; and
    assembling the challenge message to include an instruction to perform a hash algorithm, the plain text string, the signature, and the hash algorithm to be used to perform the hash;
  transmitting the challenge message to the client device;
  receiving a response to the challenge message from the client device, the response from the client device comprising a value, and wherein in a correct response, the value is equal to the value of the random token; and
  forwarding the email to one or more recipients when the response to the challenge message is correct.

12. The non-transitory computer readable medium of claim 11, further comprising:
  discarding the received email message when the response to the challenge message from the client device is incorrect.

13. The non-transitory computer readable medium of claim 11, further comprising:
  transmitting to the client device an indication of a number of emails they may send when the response to the challenge message is correct.

14. The non-transitory computer readable medium of claim 11, wherein the response from the client device that is received after a timeout period has expired is considered an incorrect response.

* * * * *